United States Patent [19]

Sperry

[11] 3,945,569
[45] Mar. 23, 1976

[54] FOAM DISPENSING APPARATUS
[75] Inventor: Charles R. Sperry, Wilton, Conn.
[73] Assignee: Instapak Corporation, Danbury, Conn.
[22] Filed: Oct. 25, 1974
[21] Appl. No.: 517,892

[52] U.S. Cl. ................. 239/112; 239/117; 239/414
[51] Int. Cl.² ........................................ B05B 15/02
[58] Field of Search ........... 239/106, 112, 116, 117, 239/414, 411

[56] References Cited
UNITED STATES PATENTS
3,232,709   2/1966   Cole ................................ 239/112 X
3,687,370   8/1972   Sperry ................................ 239/112
3,786,990   1/1974   Hagfors ............................. 239/112

Primary Examiner—Evon C. Blunk
Assistant Examiner—Michael Mar
Attorney, Agent, or Firm—Albert Siegel

[57] ABSTRACT

Apparatus for mixing and dispensing two liquids such as organic resins and polyisocyanates which react to form a polyurethane foam. The apparatus comprises a dispensing gun and related equipment and includes a reciprocally mounted valving rod in the gun, which valving rod is circular at its ends and flattened intermediate such ends. In its retracted position, the valving rod is bathed in a liquid which acts as a cleansing agent therefor.

14 Claims, 11 Drawing Figures

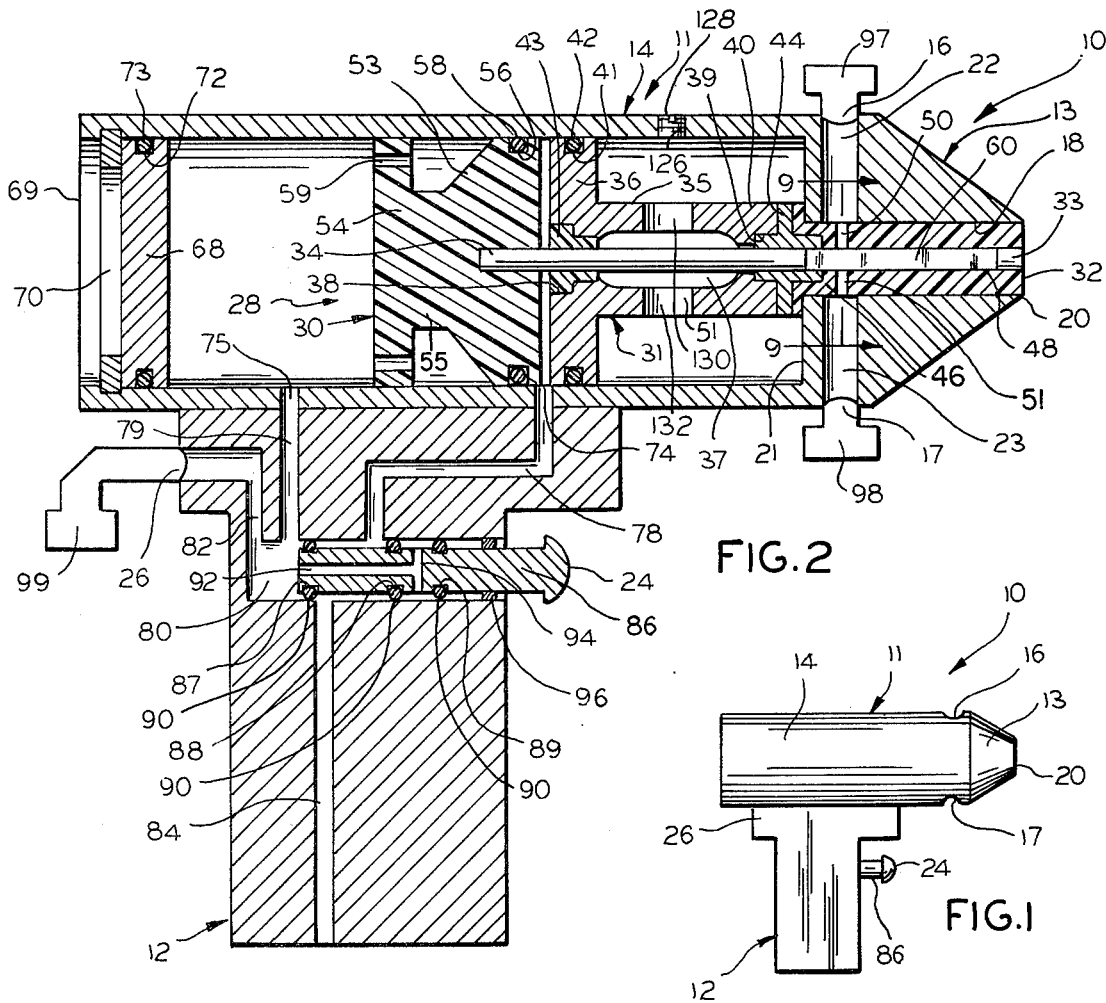
FIG.1
FIG.2
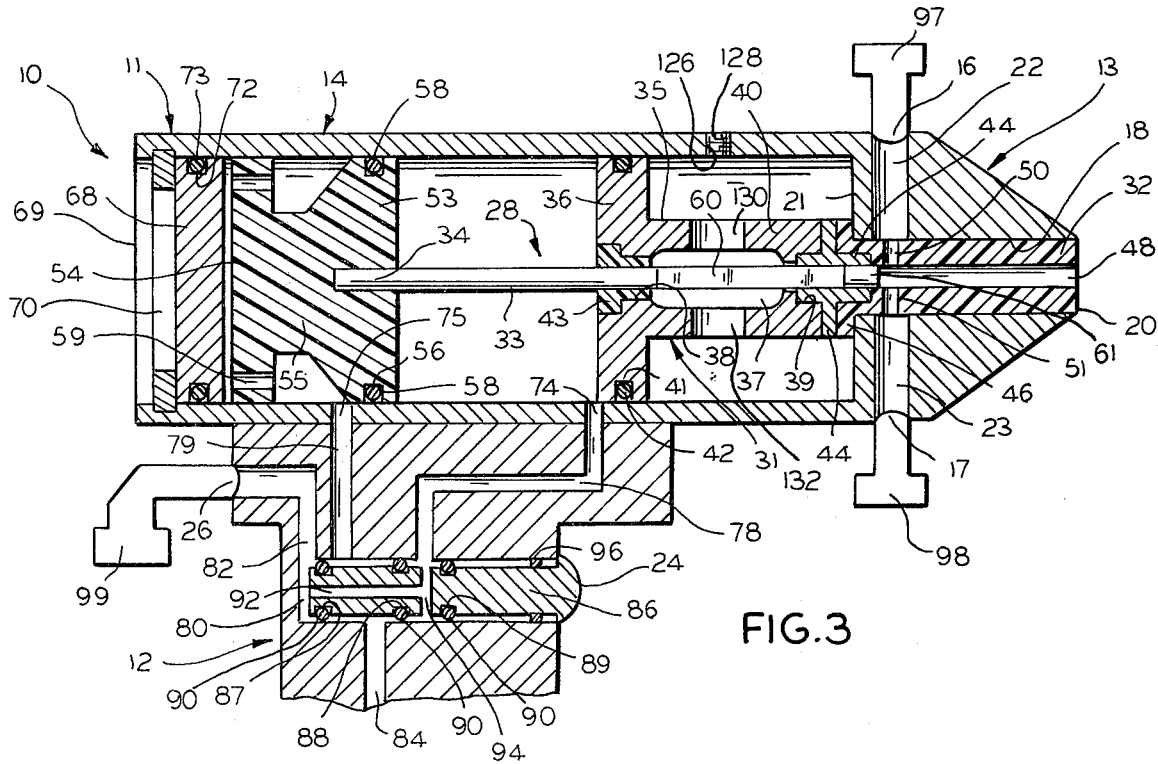
FIG.3

U.S. Patent March 23, 1976 Sheet 2 of 2 3,945,569
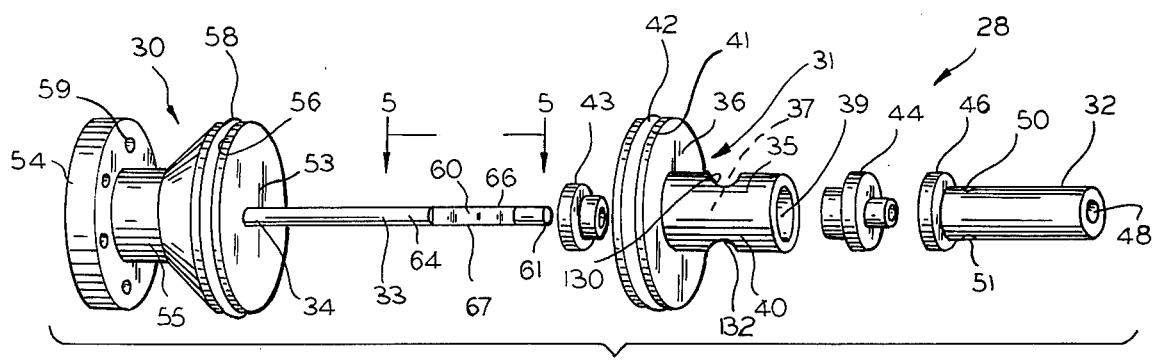
FIG. 4
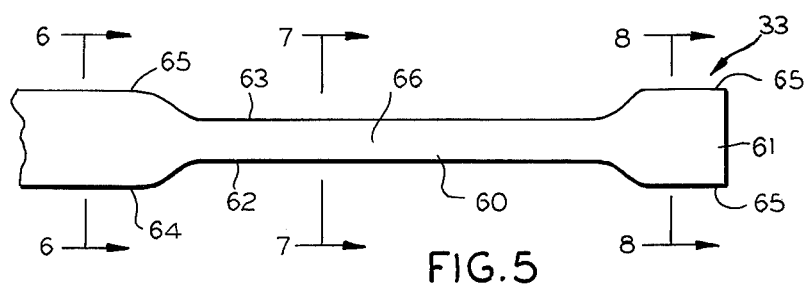
FIG. 5
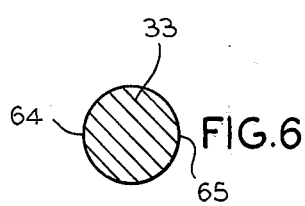
FIG. 6
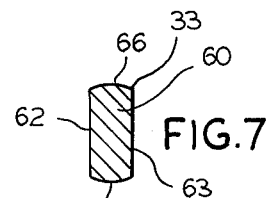
FIG. 7
FIG. 8
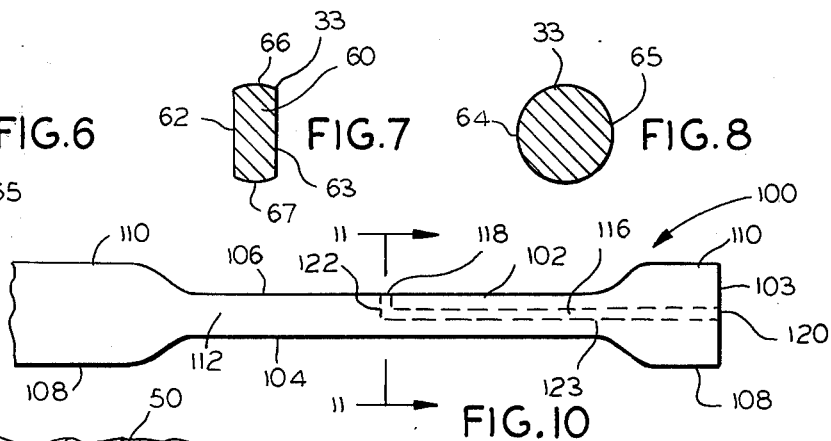
FIG. 10
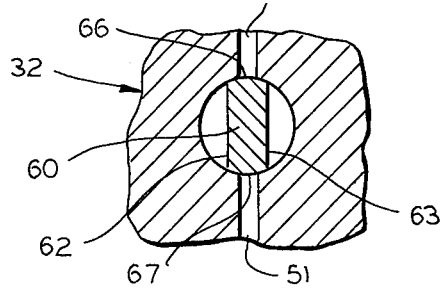
FIG. 9
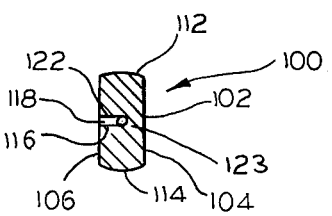
FIG. 11

FOAM DISPENSING APPARATUS

BACKGROUND OF THE INVENTION

This invention relates to apparatus for mixing and dispensing a plurality of liquids and more especially is directed to apparatus for mixing and dispensing the chemical reactants for forming polyurethane foam.

As is well known to those skilled in the art, the use of synthetic foams, especially of the polyurethane type, is growing for numerous users. Despite this, the users have been required to use dispensing equipment which is somewhat less than completely satisfactory. Much of this results from the fact that polyurethane "sets" in the dispenser — within the mixing chamber or the nozzle (which may be one and the same), which, eventually makes the system inoperative. The freeze or set problem becomes more critical when the dispensing system is used intermittantly. In some present systems, an interruption in pouring or dispensing for even 30 seconds can result in solidification of material within the dispenser.

To overcome these problems the art has generally developed along three lines viz:

1. Throw away nozzles. The nozzle containing the mixing chamber is replaced practically everytime there is an interruption in pour. For large scale use the economics of this is not particularly desirable.

2. The so-called "Solvent Flush" systems. After every dispensing action a small volume usually in the order of a few ounces of cleaning solvent, is passed through the mixing chamber to clean it. This is messy, affords some cleaning action, but in actual practice it has been found necessary to disassemble such dispensers every day after use for a thorough cleaning.

3. Dispensers containing valving rods as disclosed in Gusmer U.S. Pat. Nos. 2,890,836 and 3,263,928. In these patents a tight fitting cylindrical valving rod movable in a cylindrical mixing chamber is used, and the rod attempts to scrape the mixing chamber clean as it moves. This works fairly well except here too in practice, is is necessary to disassemble the dispenser every day after use for a thorough cleaning.

In the dispensing apparatus which I have disclosed and claimed in my U.S. Pat. No. 3,687,370, many of the foregoing problems in polyurethane dispensing have been overcome, and such units operate for extended period without cleaning. In such apparatus the cylindrical valving rod at each retraction is withdrawn into a solvent which serves for cleaning purposes. Upon protraction of the rod, a small amount of such solvent is carried into the mixing chamber for cleaning purposes.

The present invention is an improvement over the dispensing apparatus of my above noted patent, in that I now provide for substantially better cleaning of the valving rod and mixing chamber, and at the same time improve the flow of liquid through the entry ports and the sealing capability of the valving rod. How this is accomplished is set forth as this description proceeds.

Essentially, in this invention I make use of a partially flattened valving rod, to provide a self cleaning polyurethane dispenser and the like. The mode of operation is essentially the same as set out in my prior patent, the teachings of which are incorporated by reference herein.

BRIEF DESCRIPTION OF THE DRAWINGS

Referring to the drawings in which the same characters of reference are employed to indicate corresponding or similar parts throughout the several figures of the drawings.

FIG. 1 is a side view of a liquid mixing and dispensing gun, embodying the principles of the invention;

FIG. 2 is a cross-sectional view of the gun in a non-operative or closed-condition;

FIG. 3 is a fragmentary cross-sectional view similar to FIG. 2 except the gun is in the mixing-condition ready to dispense two mixed liquids;

FIG. 4 is an exploded perspective view of the various parts of the inside barrel assembly;

FIG. 5 is a fragmentary enlarged top view of the valve rod, viewed along the plane of the line 5—5 in FIG. 4;

FIG. 6 is a sectional end view of the rear portion of the valve rod taken on the plane of the line 6—6 in FIG. 5;

FIG. 7 is a sectional end view of the flattened portion of the valve rod, taken on the plane of the line 7—7 in FIG. 5;

FIG. 8 is a sectional end view of the forward portion of the valve rod, taken on the plane of the line 8—8 in FIG. 5;

FIG. 9 is a fragmentary sectional view taken on the plane of the line 9—9 in FIG. 2, to illustrate the valve rod closing the liquid pathways in the shank member;

FIG. 10 is a fragmentary enlarged top view of another embodiment of the valve rod, which includes a solvent pathway; and FIG. 11 is a sectional view taken on the plane of the line of 11—11 in FIG. 10 and viewed in the direction indicated.

DESCRIPTION OF THE PREFERRED EMBODIMENT

Referring now to FIGS. 1, 2 and 3 of the drawings, the reference numeral 10 indicates generally a gun for dispensing one or more liquids. The gun 10 is particularly suitable, although not limited thereby, for mixing two liquids such as liquid organic resins and liquid polyisocyantes, which react to form polyurethane foam. The gun 10 comprises a barrel section 11 and a handle section 12.

The barrel section 11 includes a head portion 13 and a hollow cylindrical portion 14. A pair of opposed liquid entry ports 16, 17 are provided in the head 13. An axial bore 18 is formed in the head 13 and extends from the tip 20 and through an inner wall 21 to communicate with the cylindrical portion 14.

A pair of passages 22, 23 link ports 16, 17 respectively with bore 18. One of liquids is injected in the barrel 11 at port 16, and the other liquid via port 17.

The handle section 12 is provided with an actuating button or trigger 24, for controlling the flow of pressured air into the barrel section 11 from an air inlet port 26. When the trigger 24 is outward as shown in FIG. 2, the gun 10 is in a closed-condition and the two liquids from ports 16 and 17 are prevented from mixing. When the trigger 24 is forced inward as shown in FIG. 3 the gun is in a dispensing-condition.

Referring now more particularly to FIG. 4, an inside barrel assembly is identified generally by the reference numeral 28 and comprises a movable piston 30, a substantially T-shaped reservoir member 31 and a shank member 32. A valve rod 33 is fixidly attached at its rear end 34 to piston 30, and is slidably associated with the T-member 31 and shank member 32.

The T-member 31 includes a cylindrical neck 35 extending forward from an annular shoulder 36. A reservoir 37 (FIGS. 2 and 3) is formed in the neck for containing a cleaning fluid such as "cellosolve" solvent. A rear axial bore 38 extends through the shoulder 36 to link with the reservoir 37, and a forward axial bore 39 extends from the reservoir 37 and through the forward end 40 of the neck 35. An annular notch 41 is formed in the outer periphery of the shoulder 36 to receive an O-ring 42, and thereby provide a seal between the shoulder 36 and the inside surface of the cylinder 14.

A T-shaped sleeve 43, which may be constructed of teflon or other suitable material, is seated in the rear bore 38 of T-member 31. The back end of a bushing 44 formed of metal is received in the forward end 40 of neck 35, and the front end of the bushing 44 extends into the rear end of the shank 32.

A circular cap 46 is integrally formed to the rear end of the shank 32. A central axial bore 48 is formed through the shank 32. The shank member 32 has an outer diameter just less than the diameter of bore 18 and is tightly received therein. The front side of cap 46 abutts the inner wall 21, and the back side thereof abutts the protruding circular flange of the bushing 44.

A pair of lateral openings 50, 51 are formed in shank member 32 to link passages 22, 23 respectively with the axial bore 48. The shank 32 may be formed from a plastic, such as Teflon or other suitable material.

The piston 30 is pneumatically driven to move within the cylindrical portion 14 of the barrel 13 and control the movement of the valve rod 33. The piston 30 includes a forward end 53 and a rear end 54, each having a diameter slightly less than the inside diameter of the cylinder 14. Piston ends 53 and 54 are integrally connected together by a reduced diameter portion 55. An annular groove 56 is formed in the outer periphery of the forward end 53 to seat an O-ring 58. A plurality of apertures 59 spaced apart in a circular pattern extend through the rear end 54 of the piston 30.

As may be seen particularly from FIGS. 5 through 8, the valve rod 33 is cylindrical except for an intermediate portion 60 adjacent the front end 61 of the rod 33. Portion 60 includes a pair of opposed flat or planar side surfaces 62, 63 depressed inward respectively from the opposed convex side walls 64, 65 of the rod 33. The top and bottom surfaces 66, 67 of the intermediate portion 60 are convex and a continuous part of the convex top and the bottom surfaces of the rod 33. Thus, to form the flattened portion 60, arcuate segments are cut away from the rod 33 on vertical planes parallel to the to the longitudinal axis of the rod 33 as viewed in FIG. 7.

The flattened portion 60 is in the solvent reservoir 37, when the gun 10 is in the dispensing-condition. The flattened sides 62, 63 carry the solvent into the mixing chamber, as the trigger 24 is released for switching the gun into the closed-condition.

A stop annular plate 68 is mounted at the rear end 69 of the cylindrical portion 14 of the barrel 13 in front of a retainer ring 70. An annular slot 72 is formed in plate 68 to seat an O-ring 73 therein. The forward end of the cylindrical portion 14 is defined by the inner wall 21. The piston 30 contacts the stop plate 68 when the gun 10 is in the dispensing-condition and contacts the T-member 31 when the gun is in the closed-condition.

Turning now to FIGS. 2 and 3, the pneumatic means for moving the valve rod 33 will be described. Two air ports 74, 75 are provided in the cylindrical portion 14. Port 74 is always in front of the forward end 53 of the piston 30, and port 75 is positioned so that it will always be in back of the piston forward end 53.

A pair of passageways 78, 79 in the handle 12 communicate the ports 74, 75 respectively with a cavity 80 in which the trigger 24 moves. The compressed air inlet 26 communicates with the cavity 80 via passage 82. An air outlet passage 84 provides communication from cavity 80 to the outside at the butt end of handle 12.

The trigger 24 includes a shaft portion 86 which moves within cavity 80. Three spaced apart annular grooves 87, 88 and 89 are formed in the periphery of the shaft 86, to receive O-rings 90, for sealing the desired air passages. Groove 87 is located at the rear end of shaft 86, and the remaining two grooves are located approximately midway between the ends of the shaft 86. An axial hole 92 extends from the rear end of the shaft to a point intermediate between grooves 88 and 89, and a lateral hole 94 intersects hole 92.

A retainer washer 96 is mounted on the shaft 86 of the trigger 24 to prevent the trigger from slipping out from the cavity 80.

A pressurized source 97 of a first liquid such as a liquid organic resin is connected to port 16, and a pressurized source 98 of a second liquid such as isocyanate is connected to port 17. A source 99 of compressed or pressurized gas or air is coupled to the inlet 26.

Turning now to FIGS. 10 and 11, a second embodiment for a valve rod indicated by the reference numeral 100 is shown. Valve rod 100 is also cylindrical except for a flattened portion 102 adjacent the forward end 103 of the rod 100. Portion 102 includes a pair of opposed flat or planer side surfaces 104, 106 recessed respectively from the opposed convex side walls 108 and 110 of the valve rod 100. The top and bottom surfaces 112 and 114 of the flattened portion 102 are convex and a continuous part of the convex top and bottom surfaces of the rod 100.

An elongated passage or channel 116 is formed in the rod 100 and extends from an inlet 118 in the flat side 106 of portion 102 to an outlet 120 at the forward end 103 of the rod. Channel 116 includes a lateral part 122 extending from the inlet 118 to a longitudinal part 123 which terminates with the outlet 120.

When rod 100 is in a retracted-position, the inlet 118 lies inside the cleaning solvent reservoir 37 and the channel 116 fills up with the solvent. When the rod 100 is in the extended-position, the inlet 118 lies outside reservoir 37. The solvent inside the channel 116 could now be used to clean the tip 20 of the gun 10, as the solvent flows out from the outlet 120. Also, some solvent may flow out from the inlet 118, and thereby provide solvent additional to the solvent carried out of the reservoir 37 by the flattened sides 104, 106.

Thus, the valve rod 100 cleans the inside of the gun by scraping the defining wall of axial bore 48 as the circular outer end 102 thereof moves forward, and the solvent carried by the flattened sides 104, 106 upon leaving the reservoir dissolves any residue material in the mixing chamber. The solvent channel 116 filled up with the cleaning solvent, provides additional cleaning capability for cleaning the mixing chamber and the tip of the gun.

The cleaning solvent such as cellosolve solvent is deposited into the barrel section 11 via an aperture 126. A removable screw cap 128 closes the aperture 126. The solvent is filled in the space defined by the T-reservoir member 31 and inner wall 21 and filled within reservoir 37. When the supply of solvent depletes, any remaining solvent passes through the openings 130, 132 in the neck 35 of the reservoir member 31 and into reservoir 37, as the gun is shifted from one position to another during use.

MODE OF OPERATION

The operation of the gun 10 will now be described when used for polyurethane formation. A pressurized source of liquid organic resin 97 is coupled to entry port 16 and a pressurized source of isocyanate 98 is coupled to entry port 17. A source of compressed or pressurized gas or air 99 is connected to the inlet port 26.

In the closed-condition as shown particularly in FIG. 2, the valve rod 33 extends past the openings 50, 51 in shank member 32. The convex top and bottom surfaces 66, 67 of the flattened portion 60 block openings 50, 51 (FIG. 9), and thereby prevent the flow of the resin and isocyanate.

The trigger 24 is maintained outward (forward) by the pressure built up in cavity 80 from the gas source 97. The O-ring 90 in the rear groove 87 in the trigger shaft 86, seals the exhaust pathway 84 from the air input passage 82. O-rings 90 in grooves 88 and 89 block any air flow via holes 92, 94. Air then flows into the barrel 11 only via pathway 79, to build up pressure against the back side of the piston rear end 54. Due to the air flow via piston openings 59, pressure is also developed against the back side of the piston forward end 53. This causes the front side of piston 30 to abutt the back side of shoulder 36 of the T-member 31. Air between the piston 30 and T-member 31 flows out of the barrel section 11 via passageway 78 and the space around shaft 86, and finally out of the gun through the exhaust passage 84.

In order to activate the gun 10 for mixing and spraying, the trigger 24 is pressed inward to the position shown in FIG. 3. The O-ring 90 in the rear groove 87 in the trigger shaft 86 seals the exhaust pathway 84 and passageway 79 from the air input passage 82. O-rings 90 in grooves 88, 89 confine the input air flow to passageway 78 from holes 92, 94 in the trigger shaft 86. The air pressure builds up at the front of the piston and forces the piston back toward the stop plate 68.

As the piston 30 moves backward, the valve rod 33 is retracted and moves past the openings 50 and 51 in the shank 32 and thereby permitting the inflow of pressurized resin and isocyanate. The valve rod moves within reservoir 37 except for the front end 61 thereof, which seals off the reservoir and back end of bore 48 from the liquid inrush. Therefore, when the isocyanate and resin flow into bore 48, they will mix and due to the respective pressures, will be forced or sprayed outward from the tip 20 of the gun 10.

The magnitude of liquid flow pressure will determine the rate of liquid mixing and the size of the particles ejected from the gun 10. When the gun 10 is in the dispensing condition, the flattened portion 60 of the rod 33 is immersed in the cleaning fluid of the reservoir 37. For the valve rod 100 (FIGS. 11 and 12) the inlet 118 lies within the cleaning fluid and the solvent channel 116 is filled up with the cleaning fluid. While such chamber represents the preferred embodiment hereof other means such as direct feed of solvent to the valving rod may be employed.

When it is desired to stop the despensing, either the operator or some mechanical means releases the trigger 24, and the air pressure from inlet passageway 82 causes the trigger 24 to move forwardly to the outward or rest position. As this occurs, the piston 30 and valve rod 33 moves forwardly and the valve rod 33 closes off the liquid inlet openings 50, 51. The forward end 61 of the valve rod 33 scrapes and forces any remaining isocyanate and urethane outwardly. The solvent collecting on the flattened sides 62, 63 of portion 60 cleans any residue of the isocyanate and urethane inside the gun. Since the forward end 61 of the valve rod 33 finally moves up to the tip 20 of the gun, cleaning at the tip is also accomplished. The solvent pathway 116 for the rod 100 (FIGS. 11 and 12) having the outlet 120 for the cleaning fluid at the forward end 103 provides solvent for cleaning the gun tip 20 and also the inside of the mixing chamber, and is a further safeguard for preventing hardening of the isocyanate or urethane. Thus, when it is desired to dispense again, the valve rod 33 (or 100) is easily retracted since there is no build up or hardening of urethane foam.

It is further pointed out that since the flattened sides 62, 63 are depressed inward from the cylindrical forward and rear parts of the rod 33, the space between such flattened sides 62, 63 and the bore 48 of the shank 32 enables the cleaning fluid from the reservoir 37 to flow therein as the rod 33 moves from the retracted to the extended-position. However, when the rod 33 is in the extended-position such flow from the reservoir 37 is blocked off by the cylindrical part of rod 33 rearward from the flattened portion 60.

The liquid organic resin from source 97, sometimes referred to as polyol, is one of the two primary reactants in the polyurethane foam making process and may be selected from the group consisting of polyethers, polyesters, polythioethers, polyesteramides, alkylene glycols and polyisocyanate modifications thereof. The other principal reactant in the polyurethane foam making reaction is aromatic or aliphatic polyisocyanates. Ethylene glycol monethyl ether has been found to be the most effective cellosolve used, for preventing reaction in the manufacture of polyurethane foam.

It will be appreciated that numerous changes and modifications can be made to the embodiment described herein without departing from the sprit and scope of the invention.

I claim:

1. In an apparatus for mixing and dispensing a plurality of liquids having a housing means, a mixing chamber in said housing means having an outlet at its forward end and a plurality of entrance ports upstream of said outlet and each entrance port for introducing fluid into said chamber, a movable valving rod for opening and closing said entrance ports, means for moving said valving rod from a forward or extended-position to rear or retracted-position away from said forward end, and a reservoir adapted to hold material for cleaning said rod when in said retracted position, the improvement comprising:

said rod having a reduced cross-sectional portion intermediate the ends thereof having a portion with a flat side, said flat side being positioned in said reservoir when the rod is in said retracted-position and out of the reservoir and within the mixing chamber when the rod is in the extended-position.

2. The rod of claim 1, wherein said flat side is depressed inward from an adjacent longitudinal surface of the rod.

3. The rod of claim 1, wherein said portion presenting convex surfaces to said entrance ports when said rod is in the extended-position.

4. The rod of claim 1, wherein:
a second side of said portion of the rod is flat.

5. The apparatus as recited in claim 1 and in combination therewith:
   a. a source of liquid organic resin in communication with at least one entrance port;
   b. a source of liquid isocyanate in communication with at least one other entrance port; and
   c. means for reciprocating said valving rod.

6. The rod of claim 1, wherein two opposed sides of said portion are flat and the remaining surfaces of said portion are convex.

7. The rod of claim 5, wherein said flat sides are positioned in said reservoir when the rod is in said retracted-position and said convex surfaces blocking said entrance ports when the rod is in the extended-position.

8. The apparatus as recited in claim 6 and in combination therewith:
   a. a source of liquid organic resin in communication with at least one entrance port;
   b. a source of liquid isocyanate in communication with at least one other entrance port; and
   c. means for reciprocating said valving rod.

9. The rod of claim 1, wherein an elongated opening is formed in said rod and extends from said portion to the forward end of the rod to provide a flow path for said cleaning material.

10. The rod of claim 9, wherein said opening includes an inlet formed in said flat side and an outlet at the forward end of the rod, said inlet being in said reservoir when the rod is in the retracted-position and out of the reservoir when the rod is in the extended-position.

11. The rod of claim 1, wherein said rod is cylindrical except for said portion.

12. The rod of claim 1, wherein a part of said rod forward of said flat portion is cylindrical and a part of said rod rear from said flat portion is cylindrical, said cylindrical parts being dimensioned to tightly move within said gun and thereby preventing the flow of said cleaning fluid.

13. The apparatus of claim 6, wherein said flat sides are depressed inward from adjacent surfaces of said rod, to provide a space for cleaning fluid as said rod moves from the retracted to the extended-position.

14. In an apparatus for mixing and dispensing a plurality of liquids having a housing means, a mixing chamber in the housing having an outlet at its forward end and a plurality of entrance ports upstream of said outlet each for introducing fluid into the chambers, a movable valving rod for opening and closing the entrance ports, means for moving the valving rod from an extended-position to a retracted-position, and a reservoir adapted to hold material for cleaning said valving rod, the improvement comprising said rod having a reduced cross-sectional portion intermediate the ends thereof:
an elongated passageway connecting an opening formed in said rod from an intermediate opening to the forward end of the rod, said point being in said reservoir when said rod is in said retracted-position and out of said reservoir and within the mixing chamber when said rod is in the extended-position.

* * * * *